(12) United States Patent
Fujimoto et al.

(10) Patent No.: US 6,509,653 B2
(45) Date of Patent: Jan. 21, 2003

(54) APPARATUS AND METHOD FOR DETECTING A CHILD SEAT

(75) Inventors: Osamu Fujimoto, Nisshin (JP); Minoru Izawa, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 87 days.

(21) Appl. No.: 09/756,861

(22) Filed: Jan. 10, 2001

(65) Prior Publication Data

US 2002/0024257 A1 Feb. 28, 2002

(30) Foreign Application Priority Data

Jan. 11, 2000 (JP) ........................................ 2000-003027

(51) Int. Cl.⁷ .................................................. B60L 1/00
(52) U.S. Cl. ........................ 307/10.1; 180/273; 280/735
(58) Field of Search ........................ 307/10.1; 180/268, 180/273; 280/735

(56) References Cited

U.S. PATENT DOCUMENTS

| 5,454,591 A | * | 10/1995 | Mazur et al. | 180/273 |
|---|---|---|---|---|
| 5,474,327 A | * | 12/1995 | Schousek | 180/268 |
| 5,785,347 A | * | 7/1998 | Adolph et al. | 180/273 |
| 5,804,887 A | * | 9/1998 | Holzapfel et al. | 180/282 |
| 5,906,393 A | * | 5/1999 | Mazur et al. | 180/268 |
| 5,996,421 A | * | 12/1999 | Husby | 73/862.451 |
| 6,012,007 A | * | 1/2000 | Fortune et al. | 180/271 |
| 6,039,344 A | * | 3/2000 | Mehney et al. | 177/144 |
| 6,070,115 A | * | 5/2000 | Oestreicher et al. | 280/735 |
| 6,092,838 A | * | 7/2000 | Walker | 177/136 |
| 6,246,936 B1 | * | 6/2001 | Murphy et al. | 280/735 |
| 6,255,790 B1 | * | 7/2001 | Popp et al. | 307/10.1 |
| 6,264,236 B1 | * | 7/2001 | Aoki | 180/268 |

FOREIGN PATENT DOCUMENTS

JP  11-1153  1/1999

OTHER PUBLICATIONS

RD 414002 A, Motor vehicle seat belt tension monitoring device for passive occupant detection, Oct. 10, 1998.*

* cited by examiner

Primary Examiner—Brian Sircus
Assistant Examiner—Sharon Polk
(74) Attorney, Agent, or Firm—Oliff & Berridge, PLC

(57) ABSTRACT

According to the invention, the presence of a child seat mounted on a vehicle seat or the presence of a passenger seated in the vehicle seat is determined automatically. A child seat detecting apparatus incorporated into a vehicle seat is provided with a plurality of load sensors comprising stress sensors or the like, and a determining function for monitoring a relative change of each load detected by each load sensor and determining whether a child seat is mounted on the vehicle seat or whether a passenger is seated in the vehicle seat by the difference of the change of each load. Accordingly, this child seat detecting apparatus makes it possible to accurately determine whether a child seat is mounted on the vehicle seat or whether a person of small stature yet who does not require a child seat is seated in the vehicle seat.

8 Claims, 20 Drawing Sheets

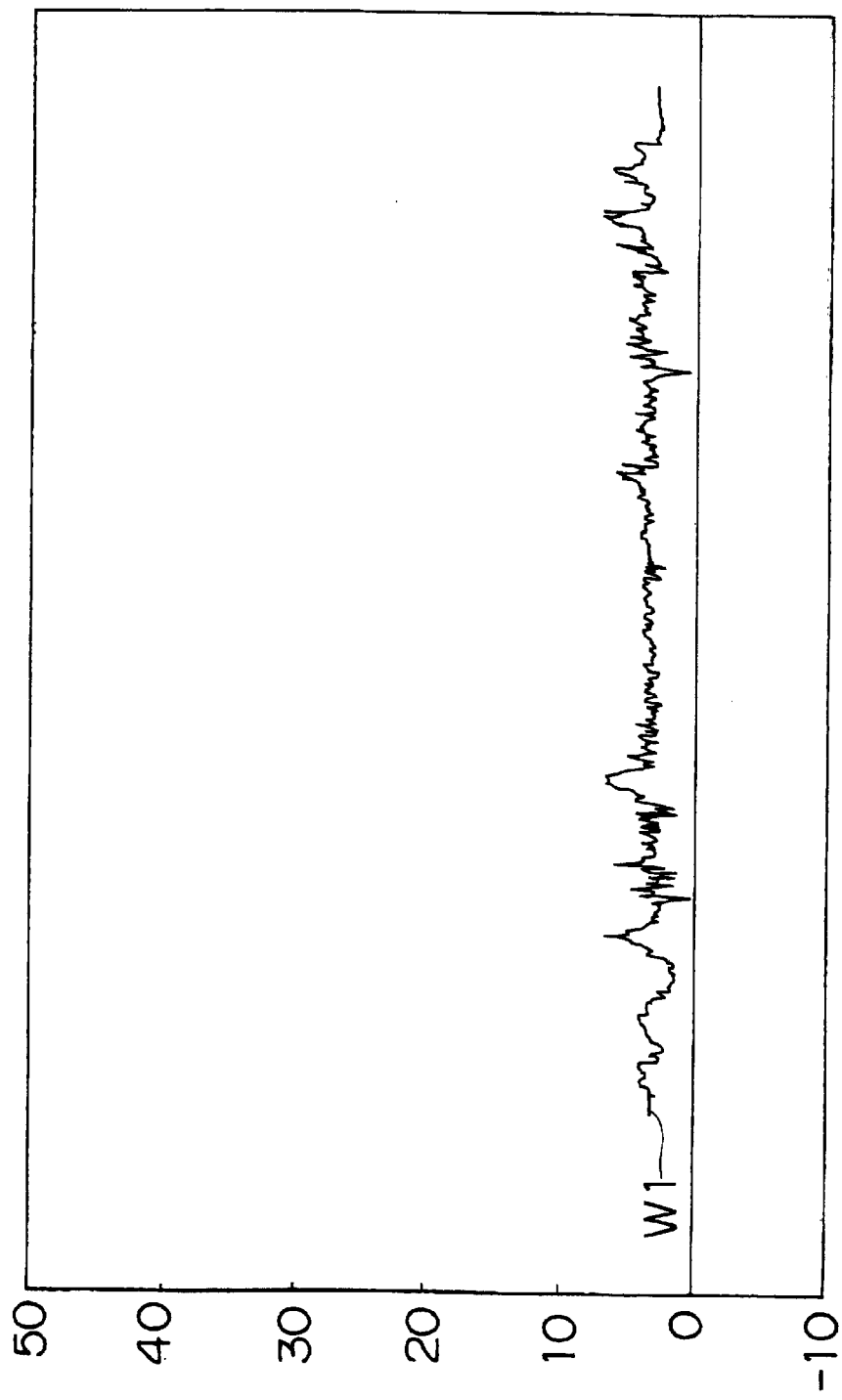

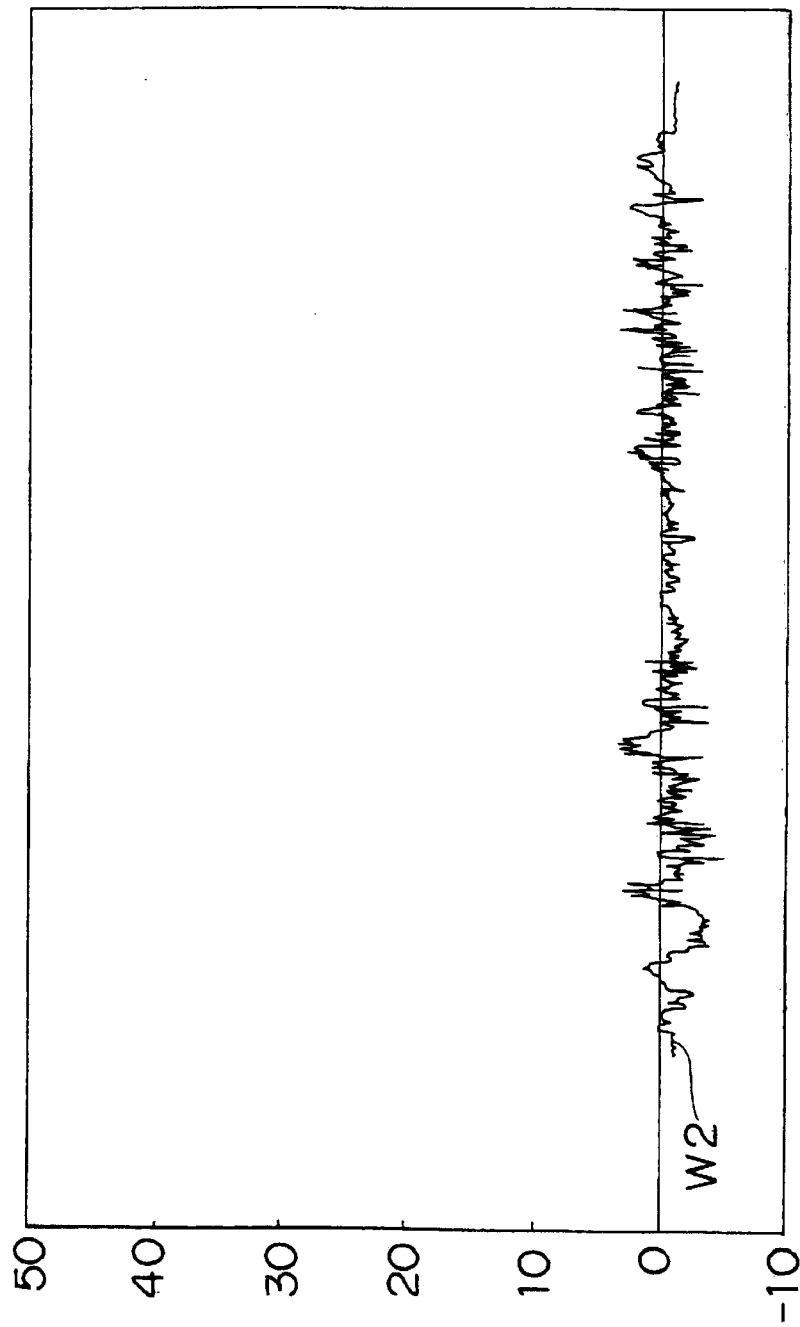

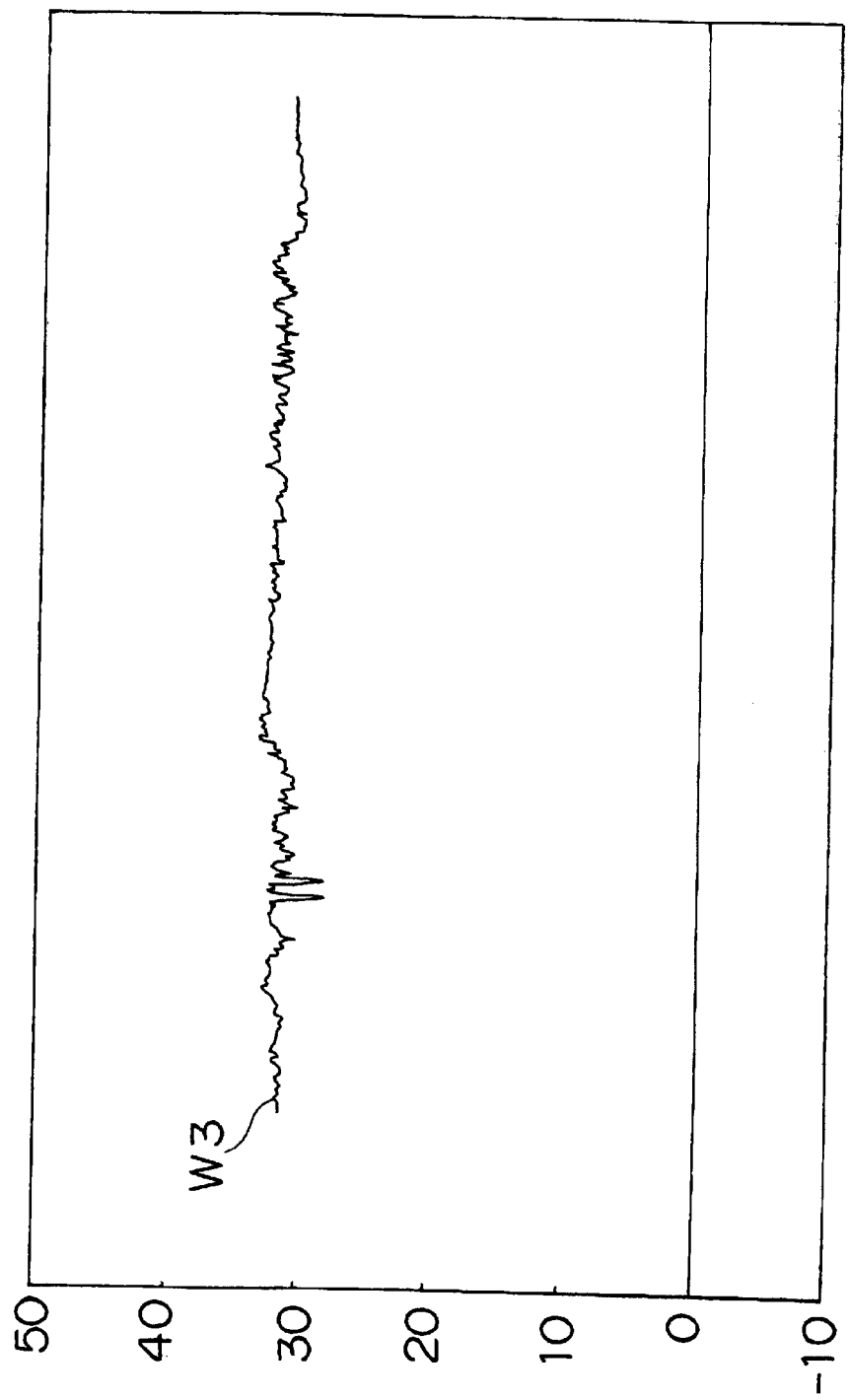

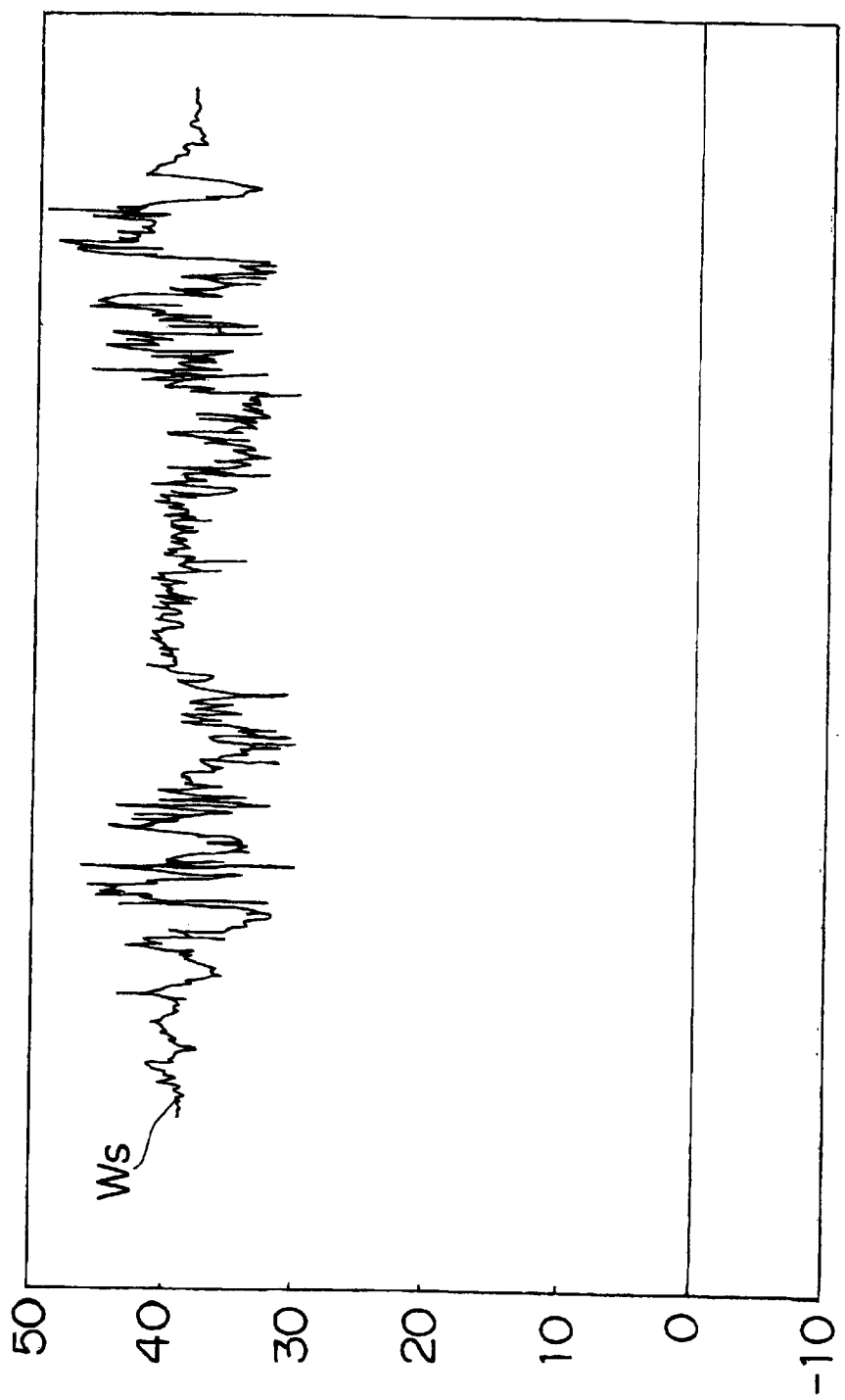

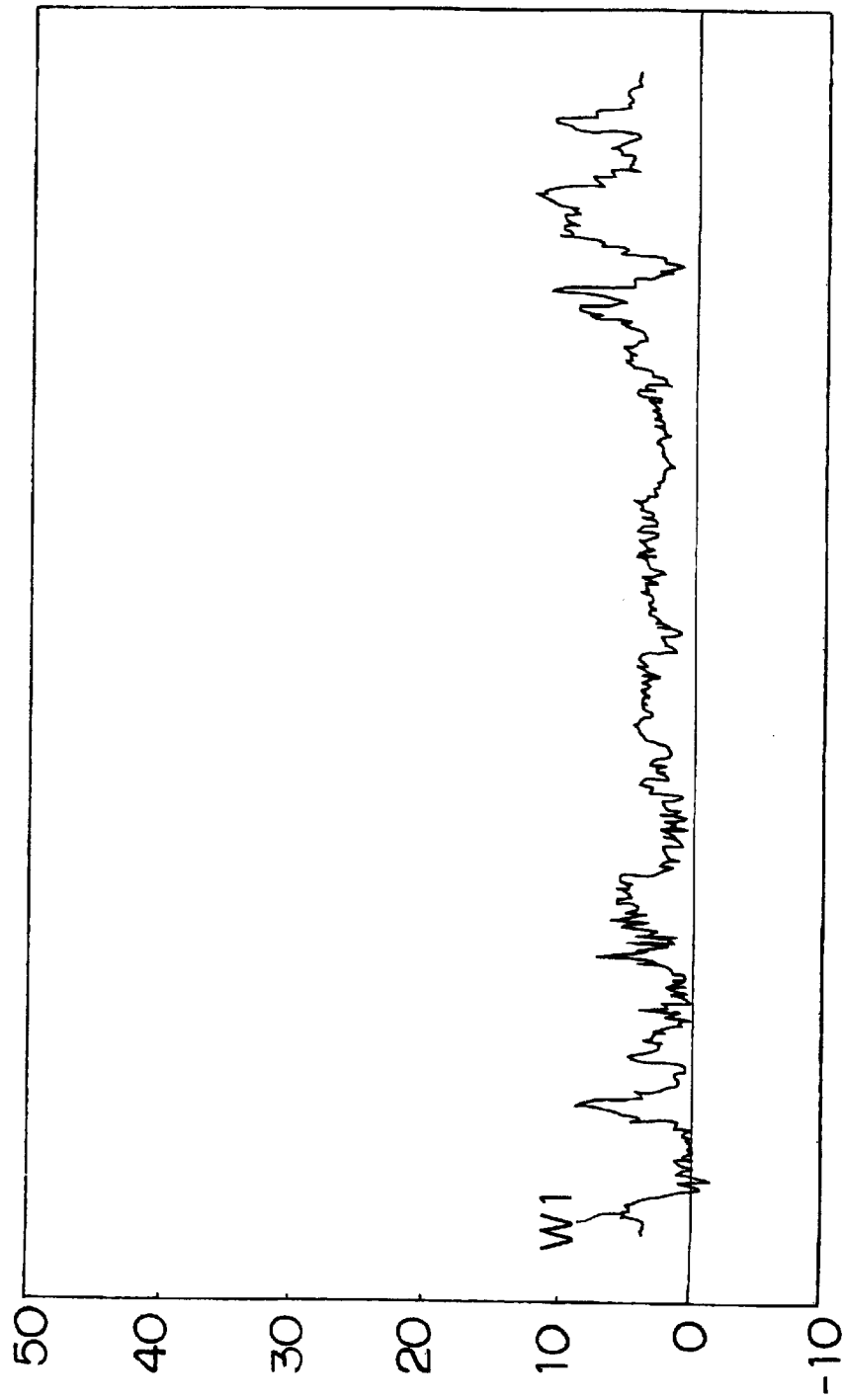

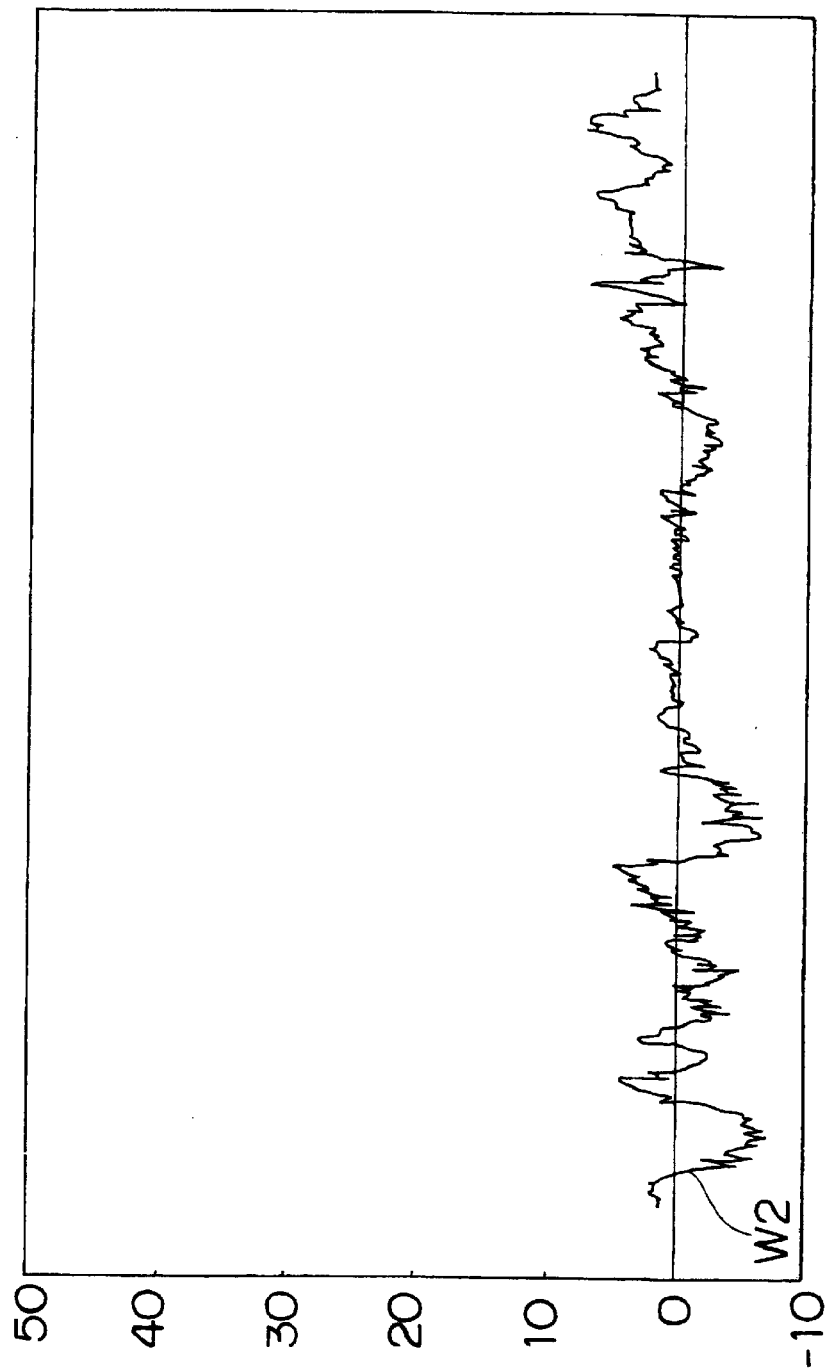

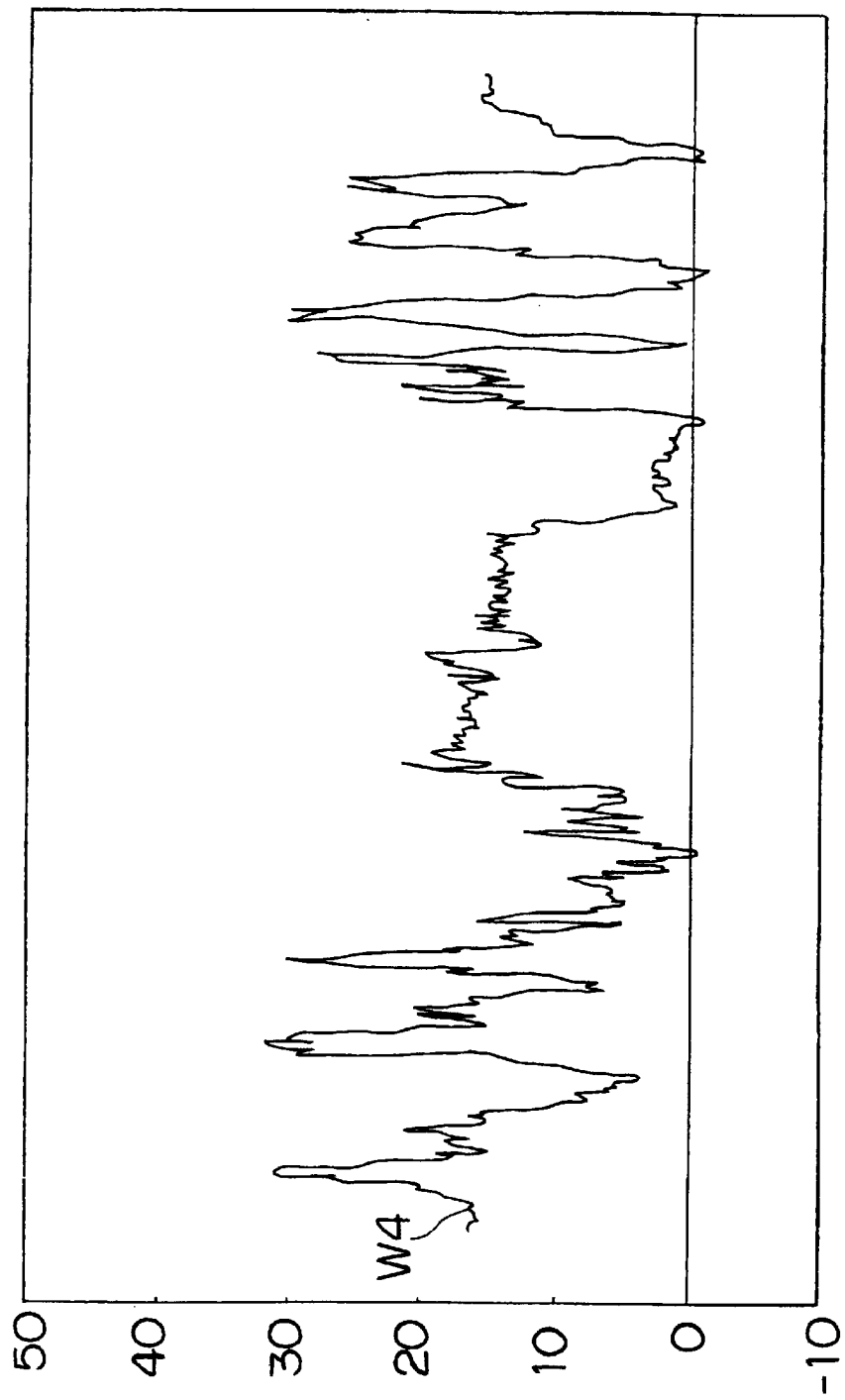

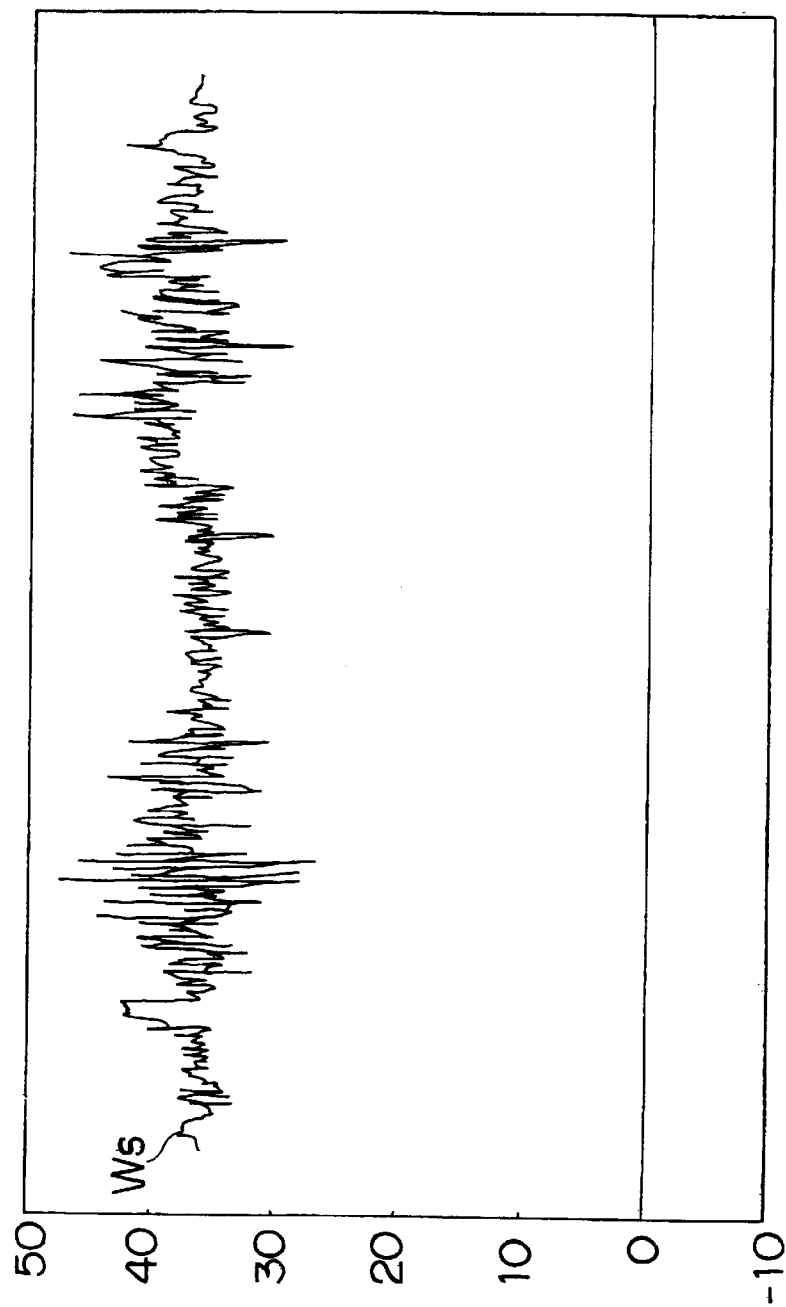

APPARATUS AND METHOD FOR DETECTING A CHILD SEAT

INCORPORATION BY REFERENCE

The disclosure of Japanese Patent Application No. 2000-003027 filed on Jan. 11, 2000 including the specification, drawings and abstract is incorporated herein by reference in its entirety.

BACKGROUND OF THE INVENTION

1. Field of the Invention

The invention relates to a child seat detecting apparatus, and more particularly to an apparatus and method for detecting a child seat mounted on a vehicle seat.

2. Description of Related Art

When a child is seated in a vehicle seat of a vehicle, the child seat must be secured to the seat and the child seated therein. The child seat is constructed so as to be secured to the seat using a seatbelt, so as long as there is a seatbelt the child seat can be mounted on the seat.

When the child seat is mounted on the passenger seat and an air bag deploys during a collision, the child seat is oppressed by the pressure from the air bag such that the child seated in the child seat receives the impact. Therefore, it is desirable to have the airbag automatically switch so as not to activate during a collision when a child seat is mounted on the passenger seat.

Research is being conducted on an apparatus (e.g. Japanese Patent Laid-Open Publication No. HEI 11-1153) constructed using a weight detecting apparatus that detects a load of a passenger seated in a vehicle seat in order to automatically determine whether a person not requiring a child seat is seated in the vehicle seat or whether a child seat is mounted on the vehicle seat.

This weight detecting apparatus includes a pair of seat rails that guide the vehicle seat back and forth and four load sensors disposed between a pair of seat brackets attached to the floor of the vehicle body. The front end portions and rear end portions of the pair of seat brackets are respectively supported by separate seat brackets and the four load sensors are mounted on the front end portions and the rear end portions of this pair of seat brackets mounted left and right.

Each load sensor is tightened and secured to the seat bracket as well as the seat rail with a bolt. In this construction when a passenger sits in the vehicle seat, a load corresponding to the weight of the passenger is distributed, activating the four sensors. Accordingly, the weight detecting apparatus mentioned above enables the weight of a passenger seated in the vehicle seat to be detected based on output signals from the four load sensors.

In determining the presence of a child seat with the weight detecting apparatus, however, the mounting of a child seat is determined based on the sum of all of the loads detected by the four load sensors. As a result, when a person of small stature yet who does not require a child seat, for example, is seated in the vehicle seat, the total load is substantially equivalent to that of a mounted child seat, making it difficult to determine whether a child seat is mounted on the vehicle seat or whether a person of small stature yet who does not require a child seat is seated in the vehicle seat.

Further, when a child seat detecting apparatus which uses a weight detecting apparatus determines that a child seat is mounted on the vehicle seat when actually a person of small stature yet who does not require a child seat is seated in the vehicle seat, there is a concern that the airbag may end up being set to a non-active state.

SUMMARY OF THE INVENTION

It is an object of the invention to provide a child seat detector constructed so as to be able to accurately determine whether a child seat is mounted on a vehicle seat or whether a person not requiring a child seat is seated in the vehicle seat.

In order to achieve the foregoing object, one aspect of the invention is a child seat detecting apparatus mounted on a vehicle seat, which is provided with a plurality of load sensors that detect a load applied to the vehicle seat and a controller that monitors a relative change of each load detected by the load sensors. The controller determines whether a child seat is mounted on the vehicle seat or whether a passenger is seated in the vehicle seat by the difference of change in load detected by each load sensor.

According to the foregoing aspect, monitoring the change of each load on the vehicle seat prevents incorrect detection of a child seat mounted on the vehicle seat even if a person of small stature yet who does not require a child seat is seated thereon.

BRIEF DESCRIPTION OF THE DRAWINGS

FIG. 5A is a graph showing a load change while driving with a child seat firmly secured to a vehicle seat with a seatbelt;

FIG. 5B is a graph showing a load change while driving with a child seat firmly secured to a vehicle seat with a seatbelt;

FIG. 5C is a graph showing a load change while driving with a child seat firmly secured to a vehicle seat with a seatbelt;

FIG. 5E is a graph showing a load change while driving with a child seat firmly secured to a vehicle seat with a seatbelt;

FIG. 6A is a graphs showing a load change while driving with a person of small stature yet who does not require a child seat seated in a vehicle seat;

FIG. 6B is a graphs showing a load change while driving with a person of small stature yet who does not require a child seat seated in a vehicle seat;

FIG. 6D is a graphs showing a load change while driving with a person of small stature yet who does not require a child seat seated in a vehicle seat;

FIG. 6E is a graphs showing a load change while driving with a person of small stature yet who does not require a child seat seated in a vehicle seat;

DETAILED DESCRIPTION OF THE PREFERRED EMBODIMENTS

Figure 1:
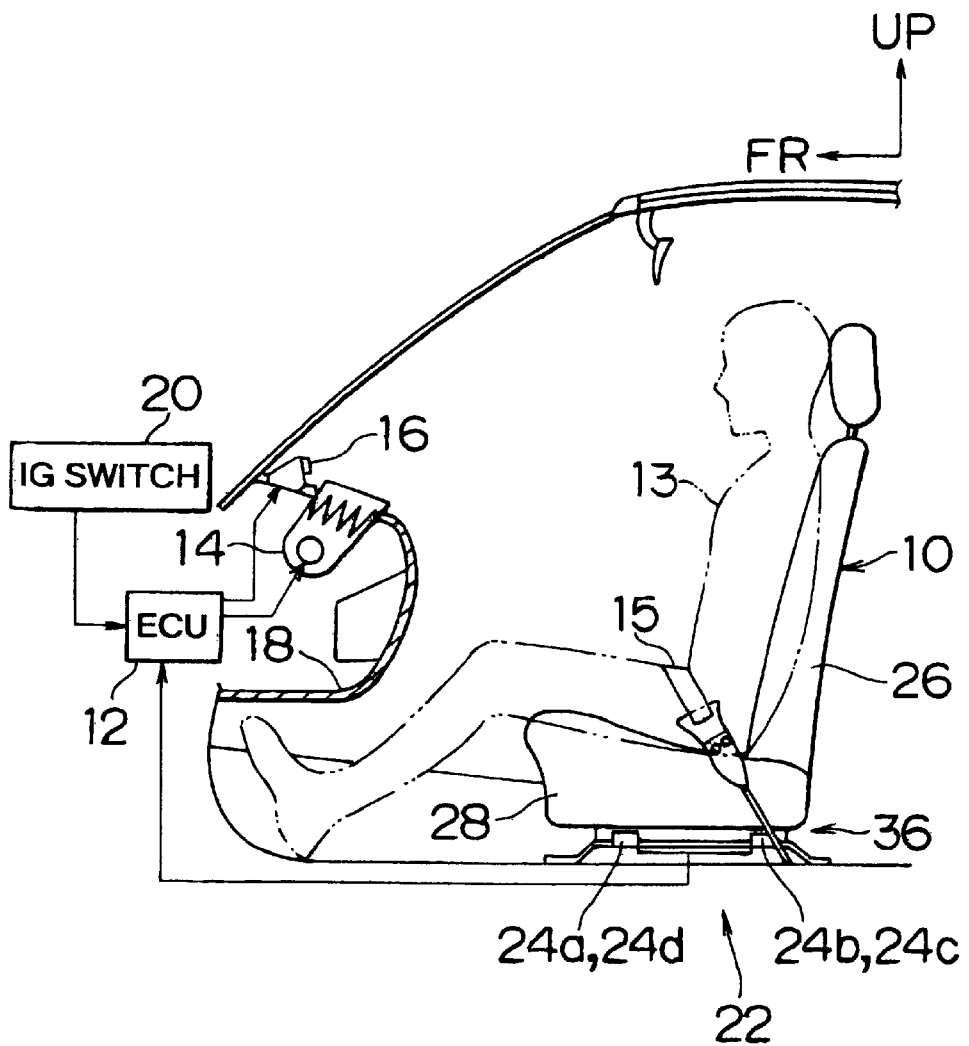
FIG. 1 is a longitudinal sectional view of a vehicle having a child seat detecting apparatus mounted thereon when cut in a vertical plane down the center of the passenger side vehicle seat with respect to the lateral direction of the vehicle, which is one embodiment of the invention.

FIG. 1 is a longitudinal sectional view of a vehicle having a child seat detecting apparatus mounted thereon when cut in a vertical plane down the center of the passenger side vehicle seat 10 with respect to the lateral direction of the vehicle, which is one embodiment of the invention.

As shown in FIG. 1, a passenger 13 seated in a vehicle seat 10 is restrained by a seatbelt 15. In this vehicle, an airbag module 14 is installed as a means to protect the passenger 13 from impact during a collision.

The system of this embodiment is provided with an electronic control unit (hereinafter referred to as an ECU) 12 to which the airbag module 14 and an indicator 16 are connected. The airbag module 14 is housed in an instrument panel 18 in the vehicle cabin and is activated by a predetermined drive signal input from the ECU 12.

The indicator 16 is mounted on the front face of the instrument panel 18 and lights upon receiving a predetermined light signal from the ECU 12. The ECU 12 lights the indicator 16 when activation of the airbag module 14 is inhibited.

An ignition switch (hereinafter referred to as an IG switch) 20 that switches between start and stop of the vehicle is connected to the ECU 12. The IG switch 20 is constructed so as to be able to switch in order between three states: OFF, ON, and STARTER ON. The ECU 12 determines whether the IG switch 20 is ON or OFF based on an output signal therefrom and starts the vehicle when it determines that the IG switch 20 is ON.

The child seat detecting apparatus 22 incorporated into the vehicle seat 10 is provided with a plurality (four in this embodiment) of load sensors 24a through 24d comprising stress sensors or the like, and has a function for monitoring the relative change of each load detected by each load sensor 24a through 24d, and determines from the change in each load whether a child seat (not shown) is mounted on the vehicle seat 10 or whether a passenger is seated in the vehicle seat 10.

Figure 2:
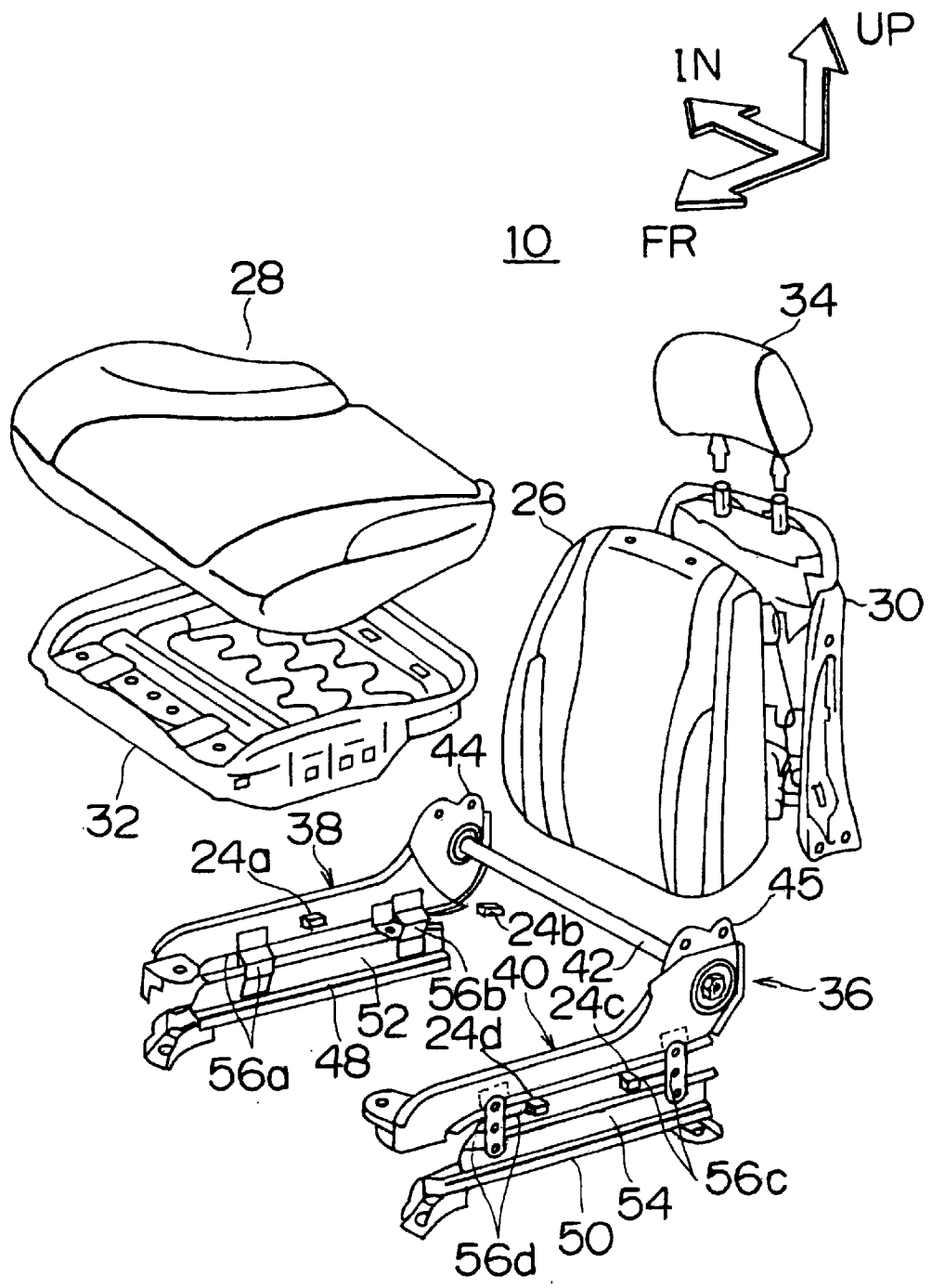
FIG. 2 is an exploded perspective view of a vehicle seat provided with a child seat detecting apparatus of the present embodiment.

FIG. 2 is an exploded perspective view of a vehicle seat 10 provided with a child seat detecting apparatus of the present embodiment.

As shown in FIG. 2, the vehicle seat 10 is provided with a seat back 26, a seat cushion 28, a seat back frame 30, a seat cushion frame 32, and a headrest 34. A slide mechanism 36 that slides the vehicle seat 10 back and forth is also mounted on the bottom of the vehicle seat 10.

The slide mechanism 36 includes an inner side adjuster 38 and an outer side adjuster 40 that support the seat cushion frame 32, a rod 42 hanging cross-wise between the left and right adjusters 38 and 40, brackets 44 and 45 that support the seat back frame 30 with both ends of the rod 42, lower seat rails 48 and 50 fixed to the vehicle body floor (not shown), upper seat rails 52 and 54 that slidably engage with the lower seat rails 48 and 50, and brackets 56a through 56d that secure the front end portions and the rear end portions of the upper seat rails 52 and 54 with the adjusters 38 and 40.

The first through the fourth load sensors 24a through 24d that detect a load are mounted on the brackets 56a through 56d. These load sensors 24a through 24d comprise stress gauges, for example, and detect the amount of each load acting on the brackets 56a through 56d corresponding to the weight of a passenger 13 when that passenger 13 is seated in the vehicle seat 10. Therefore, the weight of the passenger 13 seated in the vehicle seat 10 is obtained when the load detected by the four load sensors 24a through 24d are totaled.

In the present embodiment, the first and second load sensors 24a and 24b are mounted at the front and back, respectively, on the right side on the bottom of the vehicle seat 10, while the third and fourth load sensors 24c and 24d are mounted at the back and front, respectively, on the left side on the bottom of the vehicle seat 10.

Figure 3:
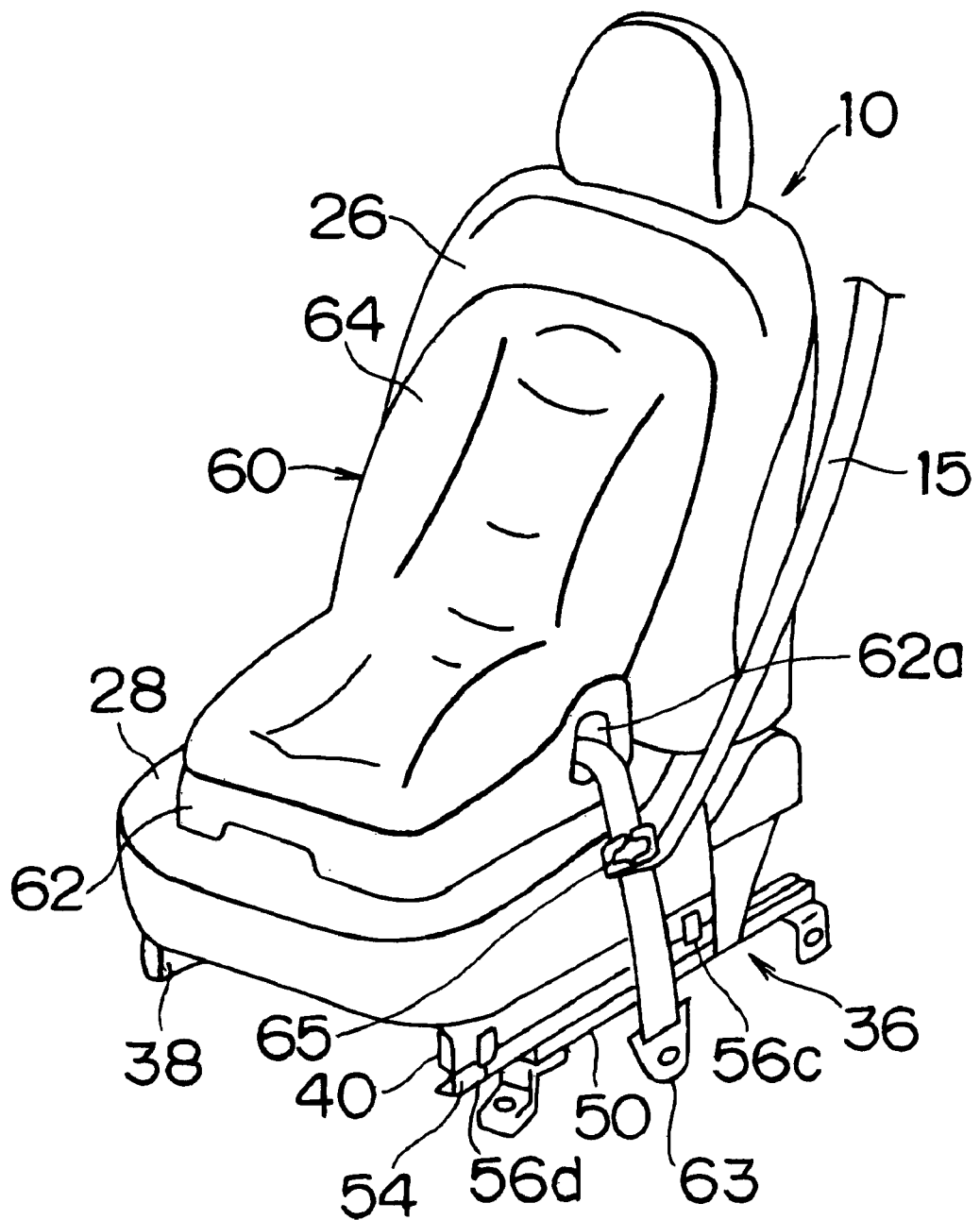
FIG. 3 is a perspective view from the right of a child seat mounted on a passenger side vehicle seat.
Figure 4:
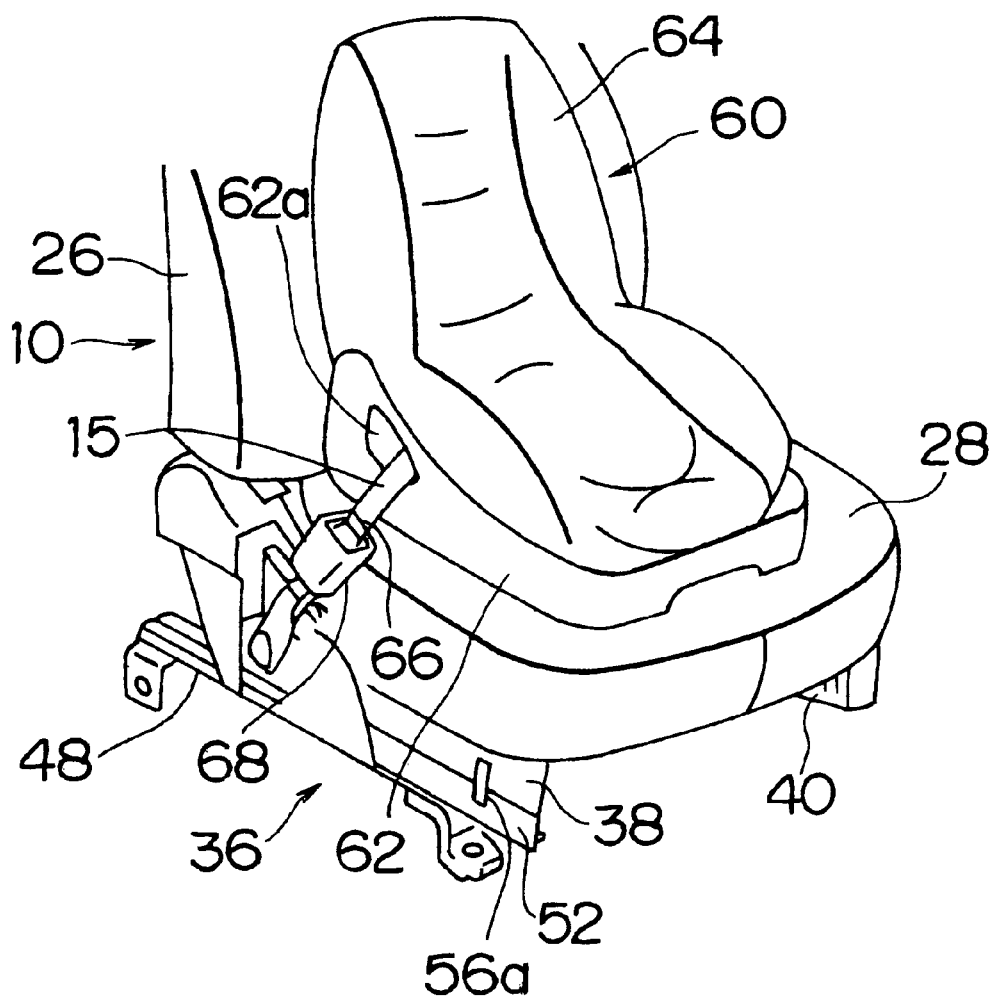
FIG. 4 is a perspective view from the left of a child seat mounted on a passenger side vehicle seat.
Figure 5D:
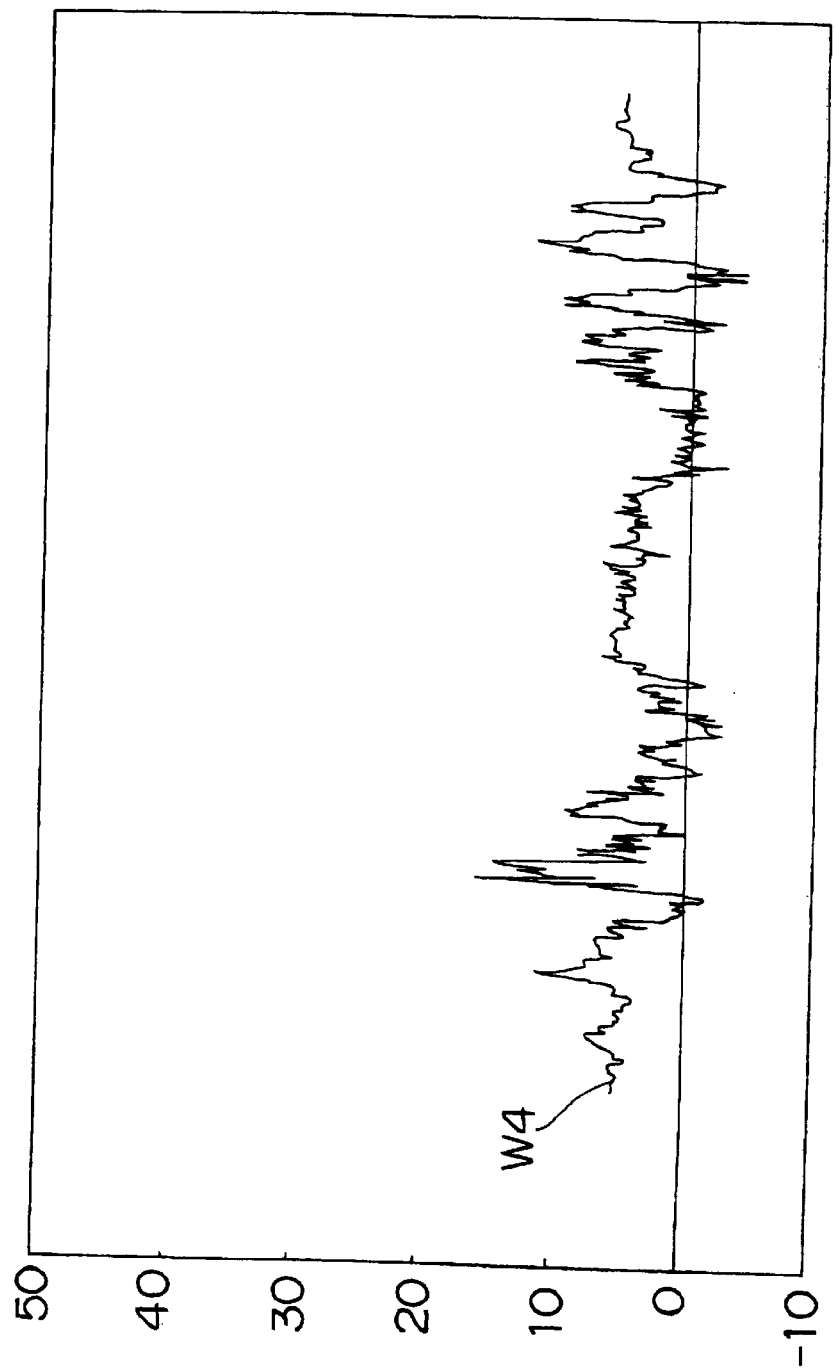
FIG. 5D is a graph showing a load change while driving with a child seat firmly secured to a vehicle seat with a seatbelt.

FIG. 3 is a perspective view from the right of a child seat mounted on a passenger side vehicle seat 10 and FIG. 4 is a perspective view from the left of a child seat mounted on a passenger side vehicle seat.

As shown in FIG. 3 and FIG. 4, a seat portion 64 on which a child sits is secured to a child seat 60. When mounting the child seat 60 on the vehicle seat 10 on the passenger side, a seat base 62 is first placed on the seat cushion 28 and the back of the seat portion 64 is placed so that it fits closely against the seat back 26. The seat base 62 has a slit 62a formed therein through which a seatbelt is able to pass in the left and right direction.

One end of a seatbelt 15 is drawn from the upper portion of a center pillar (not shown) of the vehicle, while the other end is fastened to a retaining upper member 63 retained on the outside (the door side) of the vehicle body floor. A tongue plate (clasp) 66 is disposed midway on the seatbelt 15 in the lengthwise direction thereof.

Next the method for mounting the child seat 60 will be described.

First the child seat 15 is fastened by means of a locking clip 65. At this time, the locking clip 65 is attached so as to be positioned on the left side (the door side) of the vehicle seat 10. The seatbelt 15 is then inserted with the tongue plate 66 first into the slit 62a in the seat base 62 from the outside of the vehicle body (the door side), after which it is drawn toward the inside of the vehicle body (toward the center of the vehicle).

Then with the child seat 60 firmly in place, the tongue plate 66 of the seatbelt 15 that has been drawn through the slit 62a of the seat base 62 is inserted into a buckle 68 attached at the rear portion toward the inside of the vehicle body (toward the inside). Here, the tongue plate 66 is locked by means of a lock mechanism (not shown) in the buckle 68. Mounting of the child seat 60 is then complete when appropriate tension is applied to the seatbelt 15 by sliding the vehicle seat 10 forward one or two notches.

FIG. 5A through FIG. 5E are graphs showing a load change while driving with the child seat 60 firmly secured to the vehicle seat 10 with a seatbelt 64.

During driving of the vehicle, the individual loads W1 through W4 detected by the first through the fourth load sensors 24a through 24d, as well as the total load Ws which is the sum of loads W1 through W4 fluctuate as shown in FIG. 5. The fastening force of the child seat 60 acts on the third load sensor 24c mounted on the rear portion toward the outside (the door side) of the vehicle body where the locking clip 65 is attached. Meanwhile, the front portion of the child seat 60 and the rear portion of the buckle 68 float slightly above the vehicle seat 10 due to the method for mounting the child seat 60 as mentioned above.

Accordingly, the third load sensor 24c detects a higher value than do the other load sensors 24a, 24b, 24d.

Moreover, the seat base 62 of the child seat 60 is secured on the seat cushion 28 so that there is little or no fluctuation even when driving. Therefore, the load of the third load sensor 24c and the loads of the other load sensors 24a, 24b, and 24d while driving are separated by predetermined threshold values so as not to become mixed up with one another. Accordingly, comparing the load W3 detected by the third load sensor 24c with the loads W1, W2, W4 detected by the other load sensors 24a, 24b, and 24d enables determination of whether or not the child seat 60 is mounted on the vehicle seat 10.

FIG. 6A through FIG. 6E are graphs showing a load change while driving with a person of small stature yet who does not require a child seat seated in a vehicle seat 10.

When a passenger 13 (for example, a person of small stature close in weight to the child seat 60 yet who does not require a child seat) is seated in the vehicle seat 10, the loads W1 through W4 detected by the first through the fourth load sensors 24a through 24d greatly fluctuate due to the fact that the passenger 13 moves somewhat while driving (see FIGS. 6A to 6E). As a result, the fluctuation pattern of the loads is entirely different from the fluctuation pattern shown in FIGS. 5A to 5E.

In this way, a passenger 13 seated in the vehicle seat 10 can be detected by monitoring the fluctuation pattern of the loads W1 through W4 even when a person of small stature yet who does not require a child seat, which is difficult to discriminate from a child seat 60 just by weight, is seated in the vehicle seat 10.

Therefore in this embodiment it is possible to accurately determine whether a child seat 60 is mounted on the vehicle seat 10 or whether a person of small stature yet who does not require a child seat is seated in the vehicle seat 10 by comparing the fluctuation patters of the loads W1 through W4 detected by the first through the fourth load sensors 24a through 24d of the child seat detecting apparatus 22.

Also, each of the load sensors 24a through 24d are connected to the ECU 12 and output a respective detection signal according to the distribution of load acting on the vehicle seat 10. The ECU 12 then determines the presence or absence of the child seat 60 and the presence or absence of the passenger 13 based on the output signals from the load sensors 24a through 24d and sets the airbag module 14 to an active state or a non-active state.

Next the control process executed by the ECU 12 based on the output signals from the load sensors 24a through 24d will be described.

Figure 7:
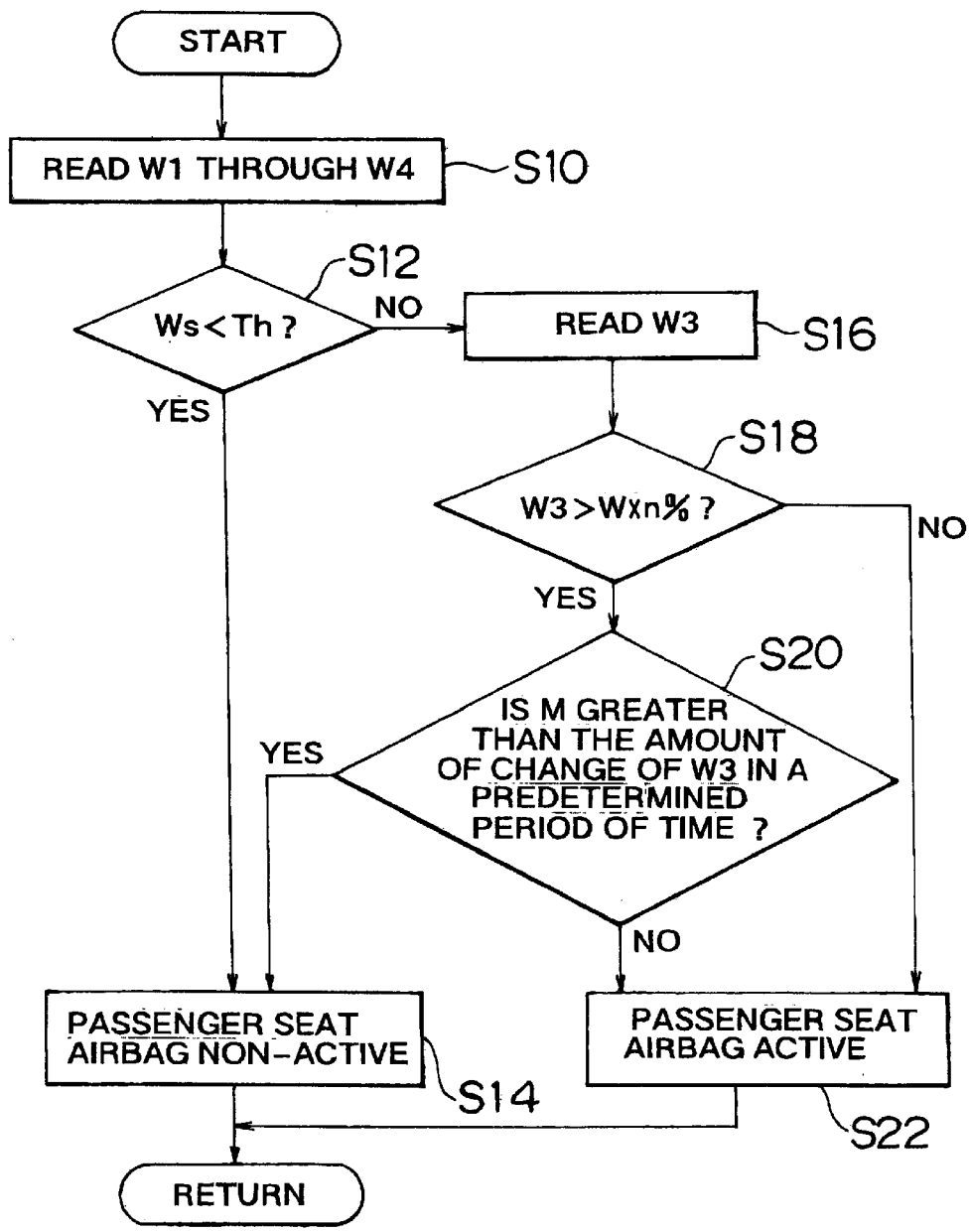
FIG. 7 is a flowchart of a determination process executed by an ECU.

FIG. 7 is a flowchart of a determination process executed by the ECU 12. The ECU 12 repeatedly executes the process shown in FIG. 7 at predetermined intervals of time.

As shown in FIG. 7, in Step S10 the load data W1 through W4 detected by the load sensors 24a through 24d is read. Next in Step S12, the total load Ws, which is the sum of the load data W1 through W4, is calculated and compared with a preset threshold Th. When a person of small stature yet who does not require a child seat is seated in the vehicle seat 10, for example, the total load Ws of the load data W1 through W4 detected by the load sensors 24a through 24d is approximately 33 kg.

The weight of the child seat 60, on the other hand, is approximately 8 kg. If the maximum value of a child that can sit in the child seat 60 is approximately 18 kg and the load from the tension of the seatbelt 15 is approximately 7 kg, then the total load detected by the load sensors 24a through 24d when the child seat 60 is mounted on the vehicle seat 10 is 33 kg at most.

Accordingly, the threshold Th of the total load Ws is 33 kg in the present embodiment.

Therefore, in Step 12 when the total load Ws detected by the load sensors 24a through 24d is less than the threshold Th (e.g. 33 kg), it is determined that the child seat 60 is mounted on the vehicle seat 10 and the process proceeds to Step S14. In Step 14, the airbag module 14 is set to a non-active state because it is highly probable that the child seat 60 is mounted on the vehicle seat 10. This prevents the airbag module 14 from activating when the vehicle is involved in a collision, thereby preventing the pressure of a deploying airbag from being applied to the child seat 60.

Also in Step S12, when the total load Ws detected by the load sensors 24a through 24d is equal to or greater than the threshold Th (e.g. 33 kg):, it is highly probable that a passenger 13 is seated in the passenger seat so the process proceeds to Step S16 in which the load data W3 detected by the third load sensor 24c is read.

Figure 6C:
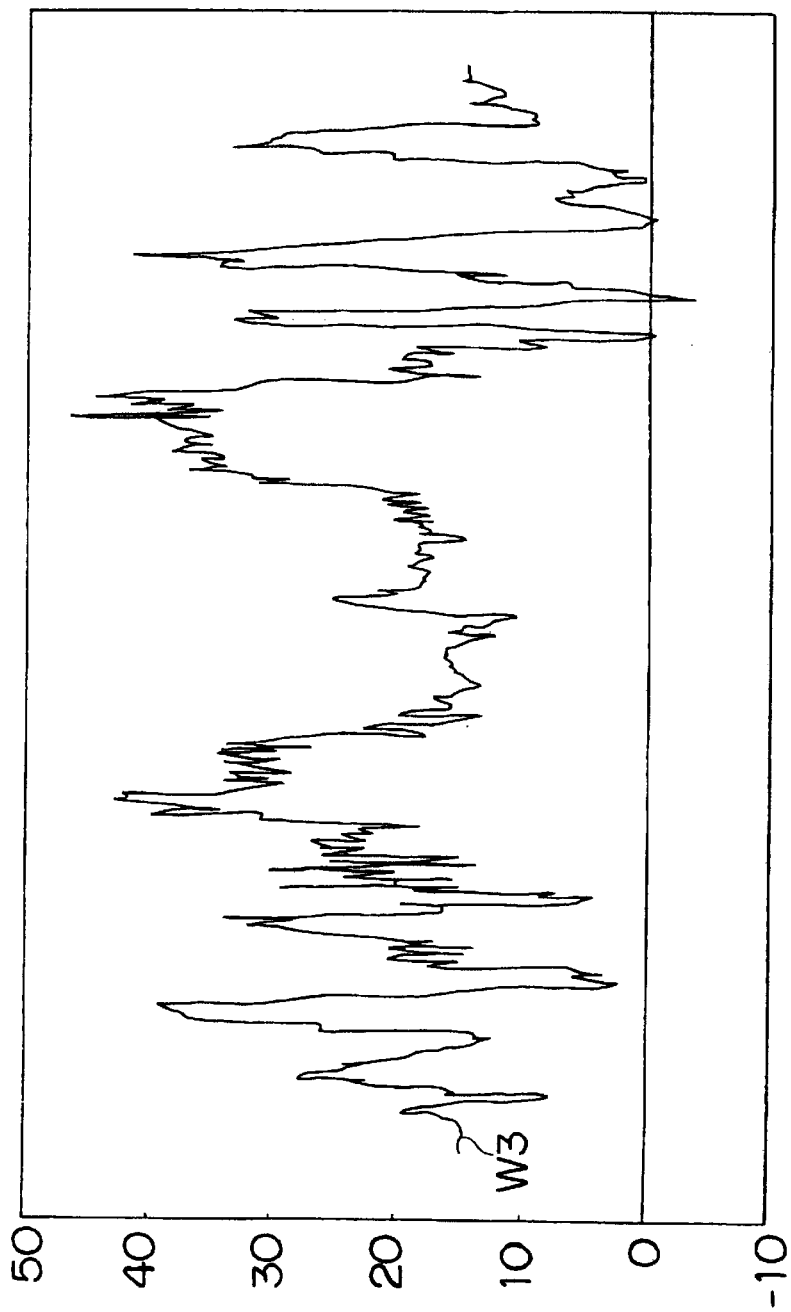
FIG. 6C is a graphs showing a load change while driving with a person of small stature yet who does not require a child seat seated in a vehicle seat.

In the next Step S18, whether or not the load data W3 is greater than a predetermined value a % with respect to the total load Ws is checked. In the present embodiment, the predetermined value a is set to a relatively low value (e.g. a=approximately 50%). Therefore in Step S18, if the value of the load data W3 detected by the third load sensor 24c is greater than a % (e.g. 50%) of the total load Ws, as shown in FIG. 5C, it is highly probable that the child seat 60 is mounted on the vehicle seat 10 so the process proceeds to Step S20. If the value of the load data W3 detected by the third load sensor 24c equal to or less than a % (e.g. 50%) of the total load Ws in Step S18, however, as shown in FIG. 6C, it is highly probable that the passenger 13 is seated in the vehicle seat 10, so the process proceeds to Step S22.

In Step S20, the fluctuation amount (the change in minimum value and maximum value of the load data W3) of the load data W3 detected by the third load sensor 24c in a predetermined period of time (approximately several seconds) is checked. Generally, the child seat 60 remains secured to the vehicle seat 10 and does not fluctuate much. In contrast, when a passenger 13 is seated in the vehicle seat 10, the load distribution usually fluctuates often.

Therefore in Step S20, when the amount of fluctuation of the load data W3 detected by the third load sensor 24c in a predetermined period of time is less than a threshold M, it is highly probable that the child seat 60 is mounted on the vehicle seat 10. Accordingly, the process proceeds to Step S14 where the airbag module 14 is set to a non-active state. If the amount of fluctuation of the load data W3 detected by the third load sensor 24c in a predetermined period of time is equal to or greater than the threshold M in Step S20, however, it is highly probable that the passenger 13 is seated the vehicle seat 10, in which case the process proceeds to Step S22.

The reason the amount of fluctuation of the load data W3 in the predetermined period of time is checked in Step 20 is because even if the value of the load data W3 in Step S18 is greater than a % of the total load Ws (e.g. greater than 50%), it is plausible that the weight from an arm of the passenger 13 resting on the rear outside portion of the vehicle seat 10, for example, is being applied near the third load sensor 24c. In such a case it is necessary to discriminate between this and a child seat 60 mounted on the vehicle seat 10.

In Step S22, the airbag module 14 is set to an active state because there is a high probability that the passenger 13 is seated in the vehicle seat 10. Accordingly, when the passenger 13 is seated in the vehicle seat 10, the airbag module 14 activates at the moment of impact in a collision, thus protecting the passenger 13 from impact.

In this way the child seat detecting apparatus 22 of the invention monitors the relative change in each load W1 through W4 detected by the load sensors 24a through 24d, and, based on the difference of the change in each load W1 through W4, is able to accurately determine whether the child seat 60 is mounted on the vehicle seat 10 or whether the passenger 13 is seated in the vehicle seat 10. This prevents the child seat 60 from being incorrectly detected as being mounted on the vehicle seat 10 even if a person of small stature yet who does not require a child seat is seated thereon.

Figure 8:
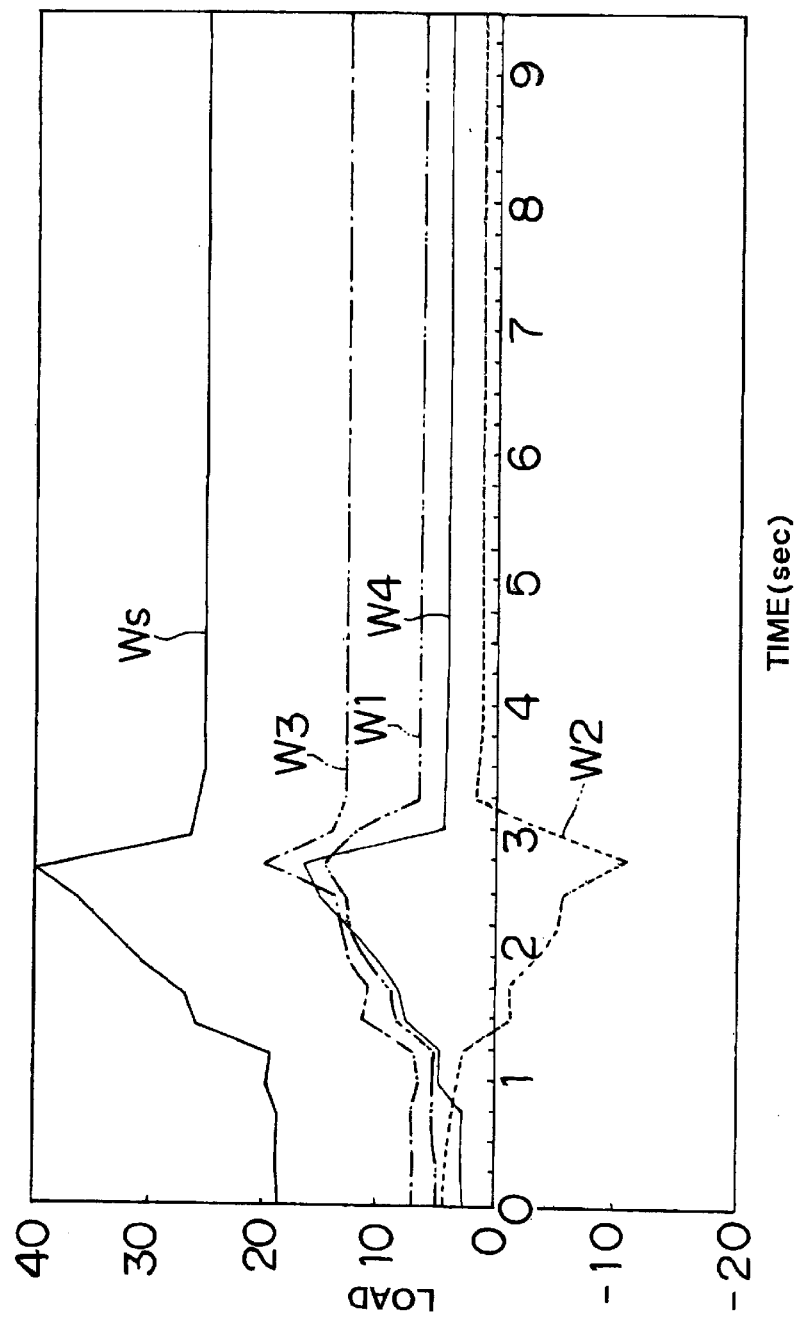
FIG. 8 is a graph showing a load change of a load sensor.

Next, a second embodiment of the invention will be described. FIG. 8 is a graph showing a load change of the load sensors 24a through 24d when the vehicle seat 10 upon which a child seat 60 is mounted is slid forward.

As shown in FIG. 8, the total load Ws and the loads W1, W3, and W4 increase as the vehicle seat 10 is slid forward, and decrease when the vehicle seat 10 is stopped at a predetermined forward position.

When the vehicle seat 10 upon which the child seat 60 is mounted is slid forward, however, tension from the child seat 60 being pushed forward is applied to the buckle 68 fastening the seatbelt 15 which fastens the child seat 60 to the vehicle seat 10. When the vehicle seat 10 is stopped, pressure for returning the child seat 60 rearward is applied to the buckle 68.

Accordingly, the load W2 detected by the load sensor 24b mounted near the buckle 68 (at the rear toward the inside of the vehicle body) decreases as the vehicle seat 10 is slid forward and increases when the vehicle seat 10 is stopped at a predetermined forward position.

In this way the load W2 detected by the load sensor 24b changes differently from the other loads W1, W3, and W4. As a result, whether or not a child seat 60 is mounted on the vehicle seat 10 is able to be determined by whether or not there is a relative difference between the load W2 and the loads W1, W3, and W4.

Figure 9:
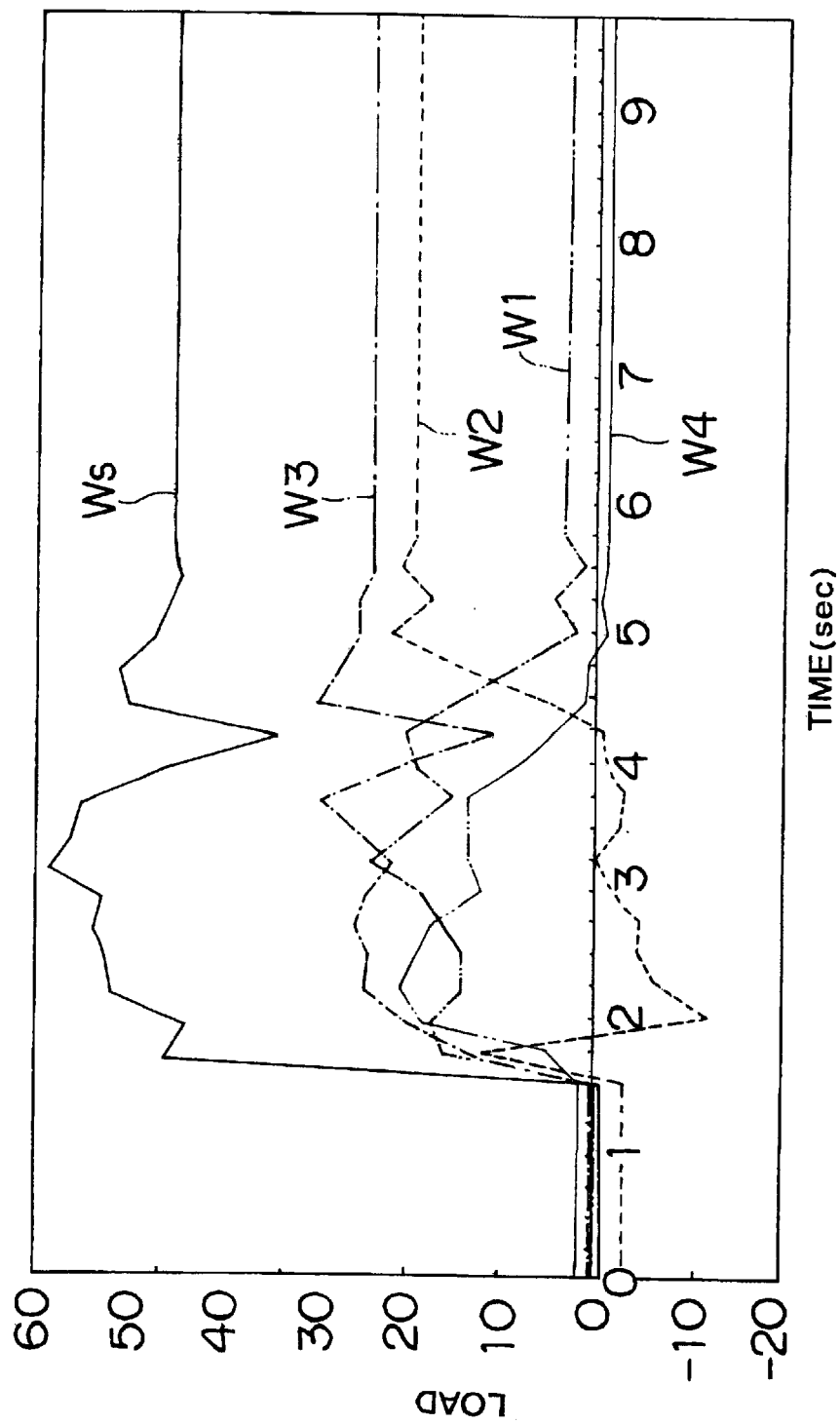
FIG. 9 is a graph showing a load change of a load sensor.

FIG. 9 is a graph showing a load change of the load sensors 24a through 24d when the passenger 13 has plopped down on the outside front end of the vehicle seat 10.

As shown in FIG. 9, when the passenger 13 has plopped down on the outside front end of the vehicle seat 10, the load change of the load sensors 24a through 24d temporarily increases and then decreases after a predetermined period of time, such that there is a large change in load compared to before the passenger 13 was seated. Note that the load change detected under these conditions closely resembles that in FIG. 8, so FIG. 8 may be referred to for comparison.

In FIG. 9, the total load Ws and the loads W1, W3, and W4 rapidly increase immediately after the passenger 13 plops down on the outside front end of the vehicle seat 10, and then decrease as time passes. Meanwhile, the load W2 detected by the load sensor 24b mounted near (at the rear toward the inside of the vehicle body) the buckle 68 decreases before the other loads W1, W3, and W4 do and then gradually increases again so as to become larger than the load detected before the passenger 13 was seated.

From this it is evident that the load W2 detected by the load sensor 24b changes differently from the other loads W1, W3, and W4 even when a passenger 13 is seated in the vehicle seat 10.

Figure 10:
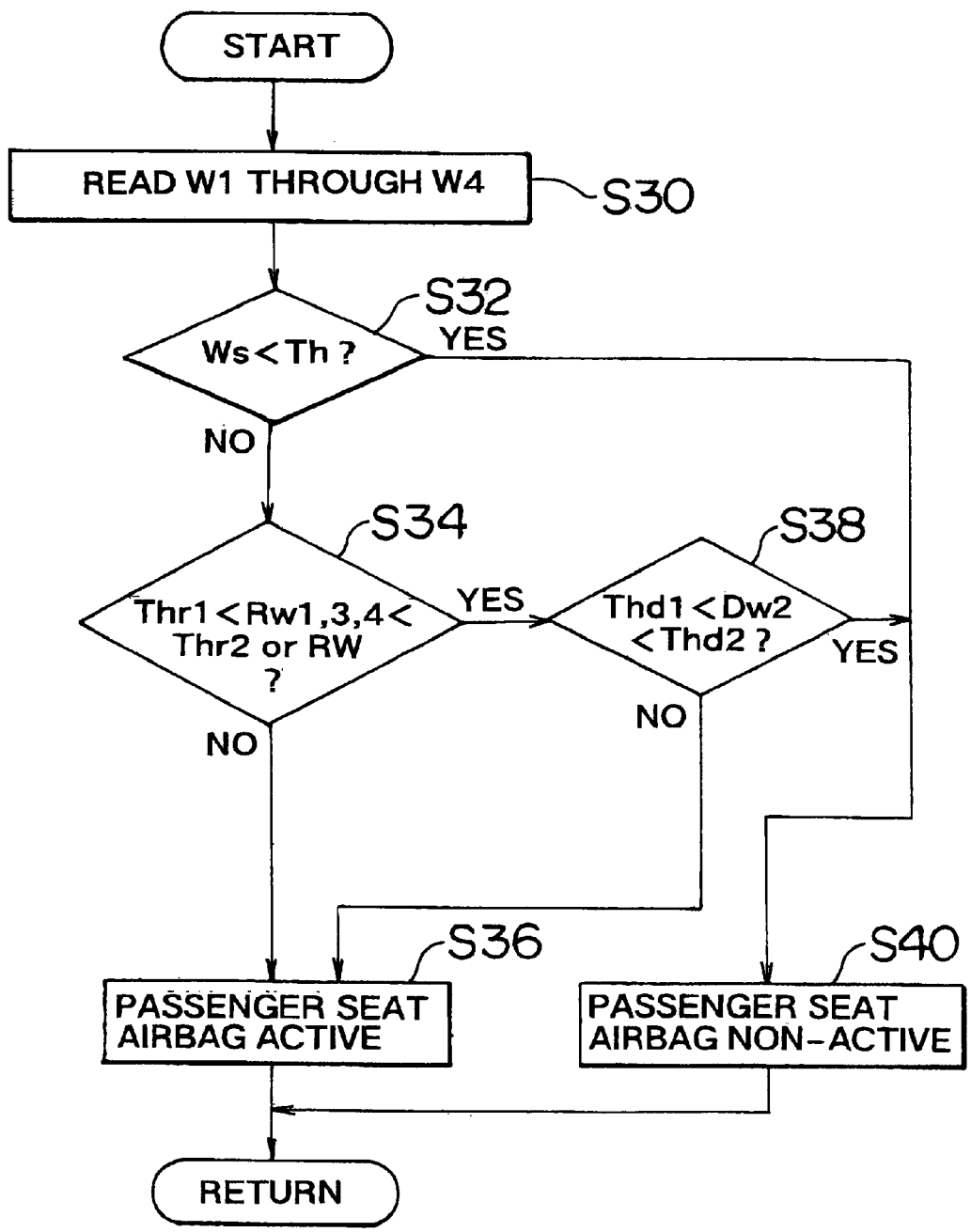
FIG. 10 is a flowchart of the determination process executed by the ECU.

FIG. 10 is a flowchart explaining the control process of the second embodiment.

As shown in FIG. 10, in Step S30, the load data W1 through W4 detected by the load sensors 24a through 24d mounted on the bottom of the vehicle seat 10 are read. In the next Step S12, the total load Ws, which is the sum of the load data W1 through W4, is calculated and compared with the preset threshold Th.

In Step S32, when the total load Ws detected by the load sensors 24a through 24d is less than the threshold Th, it is highly probable that the child seat 60 is mounted on the vehicle seat 10, in which case the process proceeds to Step S40 where the airbag module 14 is set to a non-active state.

When the total load Ws detected by the load sensors 24a through 24d is equal to or greater than the threshold Th in Step S32, however, the process proceeds to Step S34 where whether or not the percentages of increase Rw1, Rw3, and Rw4 of the loads W1, W3, and W4 or the percentage of increase Rw of the total load Ws is within a predetermined range is checked. When the percentages of increase Rw1, Rw3, and Rw4 of the loads W1, W3, and W4 or the percentage of increase Rw of the total load Ws is not within a range between an upper threshold Thr1 and a lower threshold Thr2 in Step S34, it is determined that the passenger 13 is seated in the vehicle seat 10 and the process proceeds to Step S36 (for example, when the percentage of increase is large as shown in FIG. 9).

In Step S36 the airbag module 14 is set to an active state. This enables the airbag module 14 to activate upon impact during collision when the passenger 13 is seated in the vehicle seat 10, thus protecting the passenger 13 from impact.

Also, when the percentage of increase Rw1, Rw3, and Rw4 of the loads W1, W3, and W4 or the percentage of increase Rw of the total load Ws is within a range between the upper threshold Thr1 and the lower threshold Thr2 in Step S34, the process proceeds to Step S38 (for example, when the percentage of increase is low as shown in FIG. 8). In Step S38, whether or not a percentage of decrease Dw2 of the load W2 is within a predetermined range is checked. When the percentage of decrease Dw2 of the load W2 is within a range between an upper threshold Thd1 and a lower threshold Thd2 in Step S38, the process proceeds to Step S40 (for example, when the percentage of decrease is low as shown in FIG. 9) where the airbag module 14 is set to a non-active state.

Also, when the percentage of decrease Dw2 of the load W2 is not within a range between the upper threshold Thd1 and the lower threshold Thd2 in Step S38, the process proceeds to Step S36 (for example, when the percentage of decrease is high as shown in FIG. 8) where the airbag module 14 is set to an active state.

In this way, according to the second embodiment of the invention, it is possible to accurately detect whether the child seat 60 is mounted on the vehicle seat 10 or whether the passenger 13 is seated in the vehicle seat 10 by comparing the percentages of increase and the percentage of decrease of the loads W1 through W4 detected by the load sensors 24a through 24d. This prevents the child seat 60 from being incorrectly detected as being mounted on the vehicle seat 10 even if a person of small stature yet who does not require a child seat is seated thereon.

Note that in the flowchart in FIG. 10, the ON/OFF state of a seat slide sensor may be determined (FIG. 11) before Step S30.

When the vehicle seat 10 is slid forward, the upper seat rails 52 and 54 that engage with the lower seat rails 48 and 50 of the aforementioned slide mechanism 36 (see FIG. 2) slide forward such that the slide sensors (not shown) mounted on the lower seat rails 48 and 50 turn ON.

Figure 11:
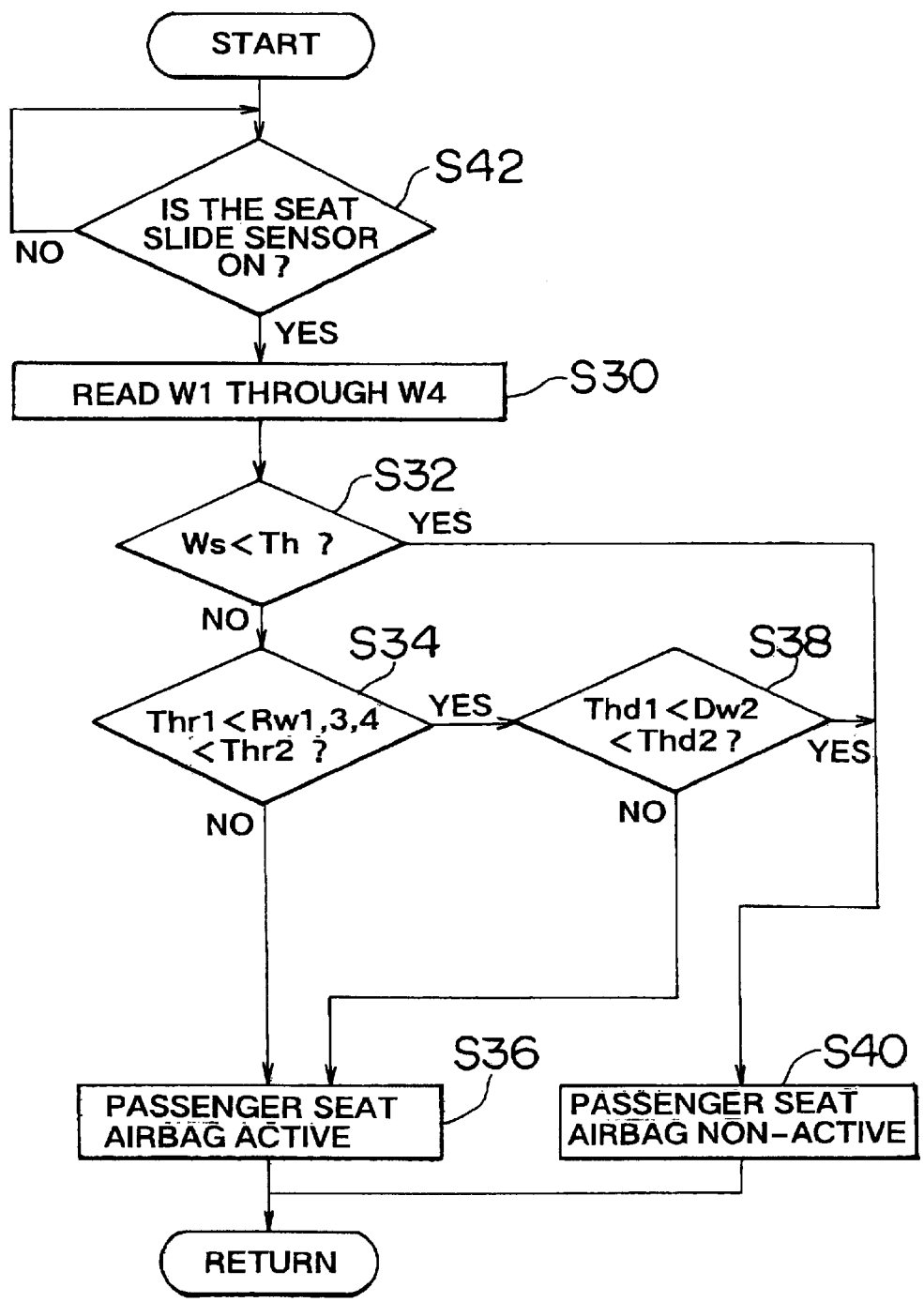
FIG. 11 is a flowchart of the determination process executed by the ECU.

Accordingly as shown in FIG. 11, when ON/OFF state of the slide sensors is determined (Step S42) before the processes (FIG. 10) after Step S30 are executed and the slide sensors are turned ON, the processes after Step S30 may be executed. More specifically, at the time when the vehicle seat 10 is slid forward, the processes shown in FIG. 10 are executed such that whether the child seat 60 is mounted on the vehicle seat 10 or whether the passenger 13 is seated in the vehicle seat 10 is determined based on the percentages of increase and the percentage of decrease of the loads W1 through W4 detected by the load sensors 24a through 24d.

This enables reliable detection of the child seat 60 when it has been mounted on the vehicle seat 10.

Figure 12:
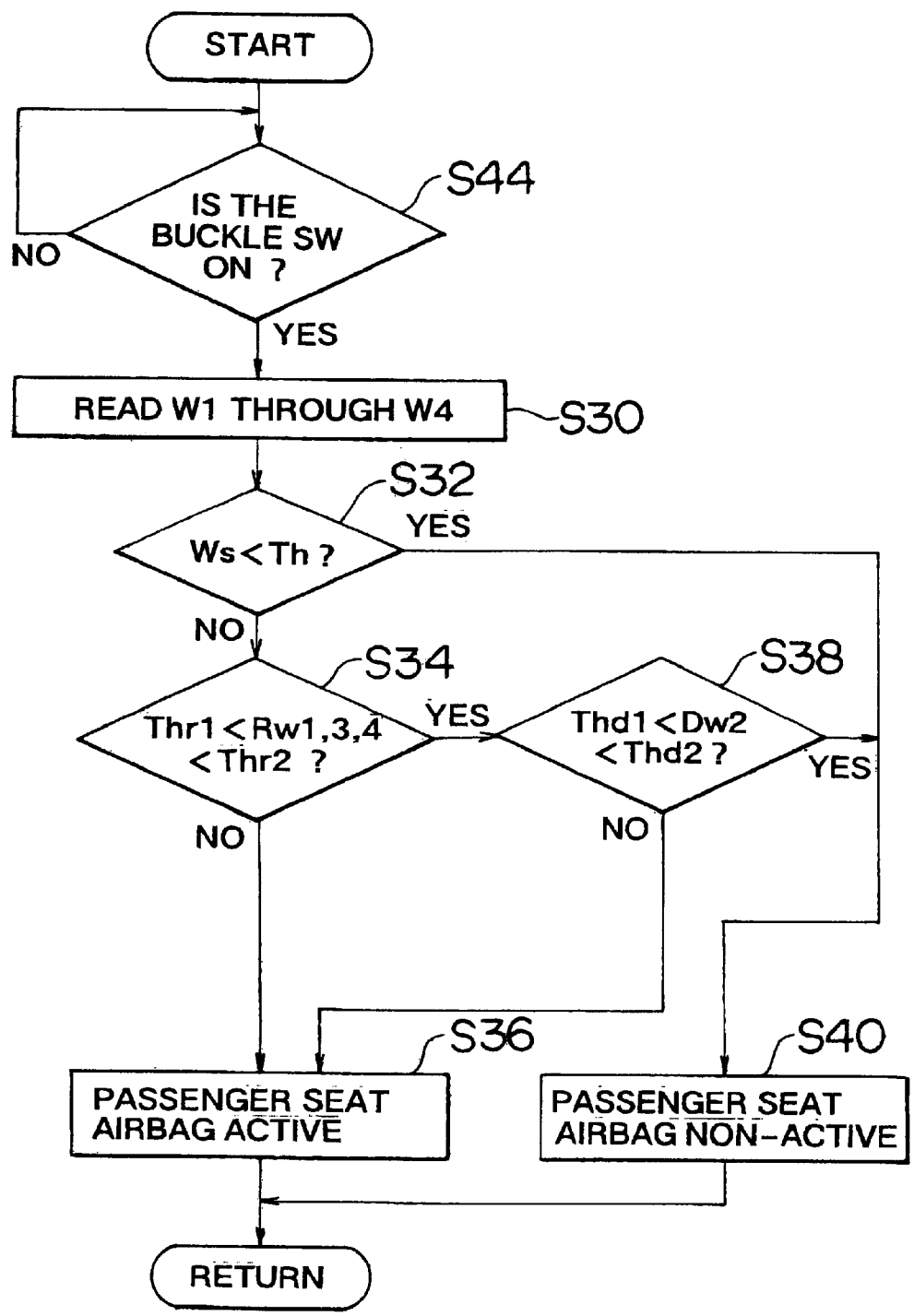
FIG. 12 is a flowchart of the determination process executed by the ECU.

Also, as shown in FIG. 12, the ON/OFF state of a buckle switch may be determined (Step S44) before Step S30.

When the tongue plate 66 of the seatbelt 15 is inserted into the buckle 68, the buckle switch (not shown) mounted on the buckle 68 turns ON.

Here, as shown in FIG. 12, when the buckle switch is ON the processes after Step S30 shown in FIG. 10 may be executed. More specifically, at the time the tongue plate 66 of the seatbelt 15 is inserted into the buckle 68, the processes shown in FIG. 10 are executed such that whether the child seat 60 is mounted on the vehicle seat 10 or whether the passenger 13 is seated in the vehicle seat 10 is determined based on the percentages of increase and the percentage of decrease of the loads W1 through W4 detected by the load sensors 24a through 24d.

This enables reliable detection of the child seat 60 when it has been mounted on the vehicle seat 10 when the tongue plate 66 of the seatbelt 15 is inserted into the buckle 68.

Since the presence of the child seat 60 and the presence of the passenger 13 can be determined by focusing on the phenomenon in which the load change detected by one of either load sensors 24b or 24c is different from the load change detected by the other load sensors due to the load change applied to the seatbelt 15 when the child seat 60 is secured to the vehicle seat 10, the case where the direction in which the load is applied is opposite from the left/right direction described in the above embodiments is of course also applicable to the invention.

Moreover, there may also be more or less than four load sensors mounted on the vehicle seat 10.

While the present invention has been described with reference to preferred embodiments thereof, it is to be understood that the present invention is not limited to the disclosed embodiments or constructions. On the contrary, the present invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the present invention.

What is claimed is:

1. A child seat detecting apparatus comprising:
    a plurality of load sensors mounted on a vehicle seat, each sensor detecting a change in a load applied to the vehicle seat, and
    a controller that monitors a relative amount of change in the load detected by each sensor of the plurality of load sensors and determines whether a child seat is mounted on the vehicle seat by the amount of the change in the loads detected by the sensors, wherein the controller determines that the child seat is mounted on the vehicle seat when an amount of fluctuation of the load detected by a first load sensor, from among the plurality of sensors, to which a fastening force from a seatbelt has been applied, in a predetermined period of time is within a predetermined range when the load detected by the first load sensor is less than a predetermined ratio of the total detected load from all the load sensors.

2. An apparatus according to claim 1, wherein
    the controller determines that the child seat is mounted on the vehicle seat when the load detected by the first load sensor to which tension from the seatbelt is applied, relative to the total load detected by the plurality of load sensors, is at a minimum.

3. An apparatus according to claim 1, further comprising:
    a slide sensor that detects sliding of the vehicle seat forward; and
    a load sensor disposed near a seat belt buckle, wherein the controller monitors an amount of fluctuation in the load detected by the sensor mounted near the seat belt buckle when sliding of the vehicle seat is detected by the slide sensor and determines whether the child seat is mounted on the vehicle seat by the amount of fluctuation detected.

4. An apparatus according to claim 1, further comprising:
    a sensor that detects whether a clasp of a seatbelt is fastened to a buckle, wherein the controller determines whether the child seat is mounted on the vehicle seat by detecting an amount of fluctuation detected by the plurality of load sensors when the sensor detects the clasp of the seat belt is fastened to the buckle.

5. A method for detecting a child seat, comprising:
    detecting a load applied to a vehicle seat from a plurality of sensors mounted on the vehicle seat;
    monitoring a relative amount of change in the load detected by the plurality of sensors; and
    determining whether a child seat is mounted on the vehicle seat by the relative amount of change in the load detected by each of the sensors, wherein
    the child seat is determined to be mounted on the vehicle seat when the relative amount of fluctuation in the load detected by a first sensor, from among the plurality of load sensors, to which a fastening force from a seatbelt is applied, in a predetermined period of time is within a predetermined range when the load detected by the first sensor is less than a predetermined ratio of the total detected load from all the load sensors.

6. A method according to claim 5, wherein
    the child seat is determined to be mounted on the vehicle seat when a load detected by the first load sensor, from among the plurality of sensors, to which tension of a seatbelt is applied, relative to the total load detected by the plurality of sensors, is at a minimum.

7. A method according to claim 5, further comprising:

detecting sliding of the vehicle seat forward;

monitoring a relative amount of fluctuation in the load detected at a sensor mounted near a seat belt buckle when sliding of the seatbelt is detected by the slide sensor; and determining whether the child seat is mounted on the vehicle seat by the amount of fluctuation detected.

8. A method according to claim 5, further comprising:

detecting whether a clasp of a seatbelt is fastened to a buckle; and determining whether the child seat is mounted on the vehicle seat by detecting an amount of fluctuation detected by the plurality of load sensors when fastening of the clasp of the seatbelt to the buckle is detected.

* * * * *